United States Patent
Zhao et al.

(10) Patent No.: US 12,430,203 B2
(45) Date of Patent: Sep. 30, 2025

(54) METHOD AND SYSTEM FOR ERROR CHECK AND SCRUB ERROR DATA COLLECTION AND REPORTING FOR A MEMORY DEVICE

(71) Applicant: Intel Corporation, Santa Clara, CA (US)

(72) Inventors: Yanxin Zhao, Shanghai (CN); Tao Xu, Shanghai (CN); Yufu Li, Shanghai (CN); Shijie Liu, Shanghai (CN); Lei Zhu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/539,380

(22) Filed: Dec. 14, 2023

(65) Prior Publication Data

US 2025/0004878 A1 Jan. 2, 2025

(30) Foreign Application Priority Data

Jun. 29, 2023 (WO) ................ PCT/CN2023/103678

(51) Int. Cl.
*G06F 11/00* (2006.01)
*G06F 11/10* (2006.01)

(52) U.S. Cl.
CPC .................................. *G06F 11/106* (2013.01)

(58) Field of Classification Search
CPC .................................................... G06F 11/106
See application file for complete search history.

(56) References Cited

U.S. PATENT DOCUMENTS

| | | | |
|---|---|---|---|
| 8,301,938 | B2 | 10/2012 | Cepulis et al. |
| 8,713,350 | B2 | 4/2014 | Walton et al. |
| 10,275,330 | B2 | 4/2019 | Hirano |
| 10,599,504 | B1 | 3/2020 | BeSerra et al. |
| 11,036,543 | B1 | 6/2021 | Swanson et al. |
| 11,636,014 | B2 | 4/2023 | Shim et al. |
| 2007/0088988 | A1 | 4/2007 | Gupta et al. |

(Continued)

FOREIGN PATENT DOCUMENTS

| | | |
|---|---|---|
| CN | 105843699 A | 8/2016 |
| CN | 111008091 A | 4/2020 |

(Continued)

OTHER PUBLICATIONS

New H3C Technologies Co., Ltd.: "H3C Servers RAS Technology White Paper", 2020.

*Primary Examiner* — Amine Riad
(74) *Attorney, Agent, or Firm* — 2SPL Patent Attorneys PartG mbB; Yong Beom Hwang (57) ABSTRACT

A method and system for error check and scrub (ECS) error data collection and reporting for a memory device. A controller includes circuitry and a buffer. The circuitry may be configured to read ECS error data from a register of a memory device and calculate an ECS error increase rate based on the ECS error data. The circuitry may be configured to inform basic input output system (BIOS) by interrupt if a total number of ECS errors reaches or exceeds an ECS error number threshold or if the ECS error increase rate reaches or exceeds an ECS error rate threshold. The controller may be an out-of-band device, e.g., a baseboard management controller or a memory micro controller.

19 Claims, 8 Drawing Sheets

(56) References Cited

U.S. PATENT DOCUMENTS

| | | | |
|---|---|---|---|
| 2017/0060681 A1* | 3/2017 | Halbert | G06F 3/064 |
| 2019/0019569 A1 | 1/2019 | Pope | |
| 2019/0332468 A1* | 10/2019 | Chaiken | G06F 3/0679 |
| 2019/0340063 A1* | 11/2019 | Chao | G06F 11/0772 |
| 2021/0149763 A1 | 5/2021 | Ranganathan et al. | |
| 2021/0389956 A1* | 12/2021 | Li | G06F 11/1024 |
| 2023/0008412 A1 | 1/2023 | Brown et al. | |
| 2023/0105565 A1 | 4/2023 | Risbud et al. | |

FOREIGN PATENT DOCUMENTS

| | | |
|---|---|---|
| CN | 108958965 B | 3/2021 |
| CN | 114664368 A | 6/2022 |
| CN | 115981898 A | 4/2023 |
| EP | 4180959 A1 | 5/2023 |
| WO | 2023044832 A1 | 3/2023 |

\* cited by examiner

METHOD AND SYSTEM FOR ERROR CHECK AND SCRUB ERROR DATA COLLECTION AND REPORTING FOR A MEMORY DEVICE

BACKGROUND

A system management mode (SMM) is a special-purpose operating mode provided for handling system-wide functions. An SMM is intended for use by system firmware. A system will enter an SMM when a system management interrupt (SMI) is triggered. SMI has a higher priority than other external interrupts. When an SMM is invoked through an SMI, all processer cores enter an SMM for a specific task such as error collection or correction and resume back to the operating system (OS) when the task is finished. A patrol scrub complete SMI is an example of an SMI.

Memory scrubbing includes reading data from each memory location, correcting bit errors in the data (if any) with an error-correcting code (ECC), and writing the corrected data back to the same memory location. Patrol scrubbing runs in an automated manner when the system is idle, while demand scrubbing performs the error correction when the data is actually requested from a memory. Patrol scrubbing is performed using an integrated memory controller (IMC) patrol engine that generates read requests to memory addresses in a stride. A guarantee is made that it will scrub every address in a memory at least once in a predetermined duration (normally 24 hours). Once the patrol scrub is complete, an SMI will be triggered to collect error data.

In order to not disturb regular memory requests from processors/processor cores and thus prevent performance decrease, scrubbing is usually done during idle periods. As the scrubbing includes normal read and write operations, it may increase power consumption for the memory compared to non-scrubbing operation. Therefore, scrubbing is not performed continuously but periodically. For many servers, the scrub period can be configured in the basic input/output system (BIOS) setup program.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e., only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

In the following description, specific details are set forth, but examples of the technologies described herein may be practiced without these specific details. Well-known circuits, structures, and techniques have not been shown in detail to avoid obscuring an understanding of this description. "An example," "various examples," "some examples," and the like may include features, structures, or characteristics, but not every example necessarily includes the particular features, structures, or characteristics.

Some examples may have some, all, or none of the features described for other examples. "First," "second," "third," and the like describe a common element and indicate different instances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform or resource, even though the instructions contained in the software or firmware are not actively being executed by the system, device, platform, or resource.

The description may use the phrases "in an example," "in examples," "in some examples," and/or "in various examples," each of which may refer to one or more of the same or different examples. Furthermore, the terms "comprising," "including," "having," and the like, as used with respect to examples of the present disclosure, are synonymous.

One of the features of the Double Data Rate 5 (DDR5) synchronous dynamic random-access memory (SDRAM) ECC is the error check and scrub (ECS) function. DDR5 ECC transparency and error scrub scheme incorporates an ECS mode with an error counting scheme for transparency. The ECS mode allows a dynamic random-access memory (DRAM) to internally read a codeword, correct a single bit error in the codeword if any, and write back the corrected codeword to the array while providing transparency to error counts. The DDR5 DRAM can run the ECS in an automatic mode where the DRAM schedules and performs the ECS commands as needed to complete a full scrub of the data in the memory array within the recommended 24-hour period. At the completion of a full-array scrub, the DRAM reports the number of errors that were corrected during the scrub and the row with the highest number of errors.

Figure 1:
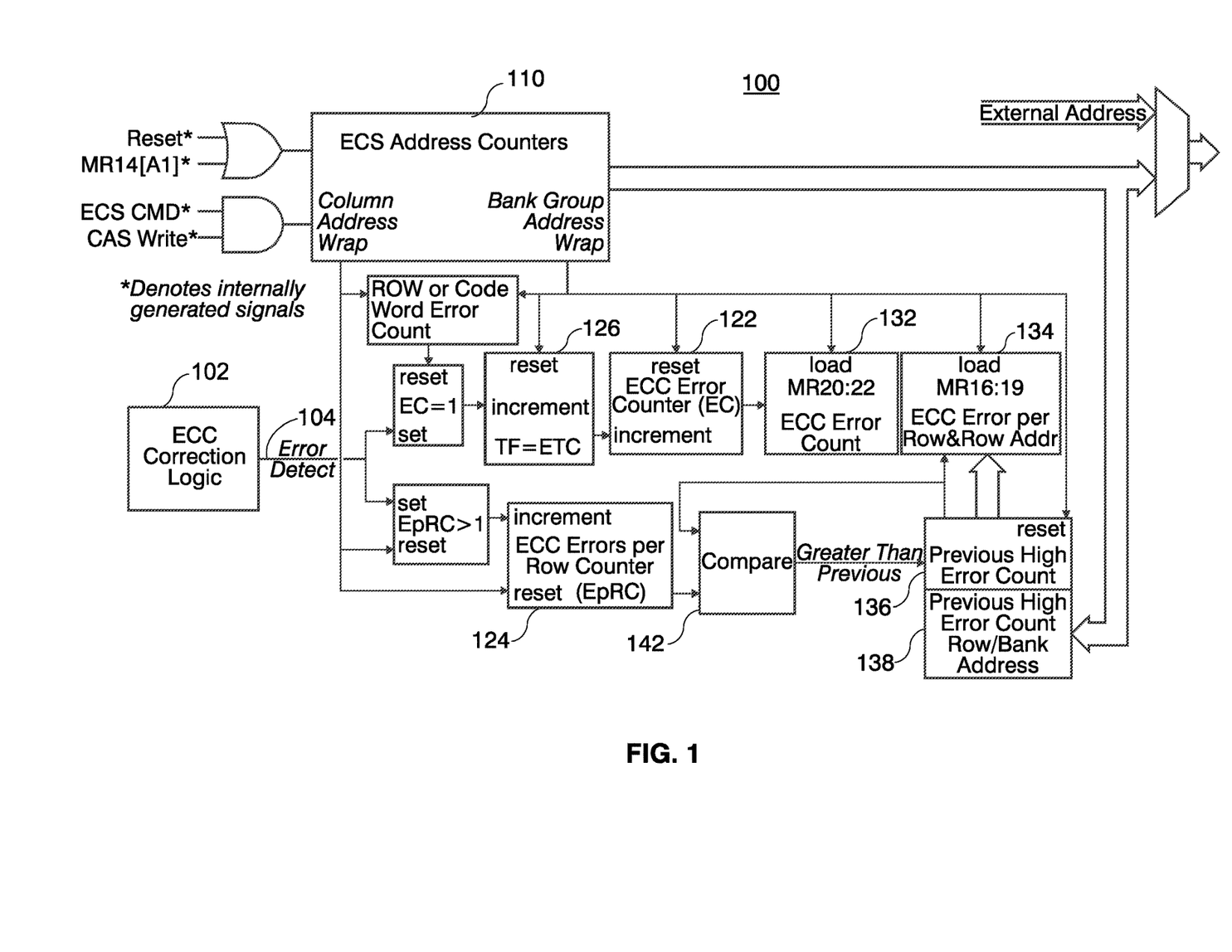
FIG. 1 shows a block diagram of an example system for implementing an ECC error check and scrub (ECS) function.

FIG. 1 shows a block diagram of an example system for implementing ECS. The system 100 may be included in a memory device (e.g., a DRAM chip). For each ECS operation, the ECS address counters 110 increment the column address after each internal ECS write command such that the next codeword and check bits are selected. Once the column counter wraps (i.e., all codewords and check bits on the row have been accessed), the row counter will increment until all codewords on each of the rows within a bank are accessed. When the row counter wraps (i.e., all rows within the bank have been accessed), the bank counter will increment and the next bank within a bank group will repeat the process of accessing each codeword. When the bank counter wraps, the bank group counter will increment and the next bank group will repeat the process of accessing each codeword, until all bank groups within the DRAM have been accessed. After all the codewords within the DRAM are read, corrected, and written back, the bank group counter will wrap, and the process begins again with the next ECS operation.

During the ECS operation, the ECC correction logic block 102 detects an error on a codeword (data plus corresponding parity bits) whose address is provided by the ECS address counters 110 and writes a corrected codeword back if a single-bit error is detected on the codeword. When an error is detected, the ECC correction logic block 102 generates an error detect signal 104. ECS may implement two counters to track the ECC codeword errors detected during the ECS operation, i.e., an ECS error counter 122 and an ECS errors per row counter (EpRC) 124. The ECC transparency and error scrub scheme incorporates a user programmable ECS threshold filter 126 that masks the error counts less than the programmed filter value. With the ECS threshold filter 126, if the ECC error threshold count (ETC) exceeds, the ECS error counter 122 begins tracking. The ETC can be one error, two errors, or some other number of errors.

The ECS error counter 122 may count the rows with errors (an ECC row error count mode) or the codewords with errors (an ECC codeword error count mode). When the ECC row error count mode is selected, the ECS error counter 122 increments each time a row with a check bit error(s) is detected. When the ECC codeword error count mode is selected, the ECS error counter 122 increments each time a codeword with a check bit error(s) is detected. The ECS error counter 122 tracks the total number of rows having at least one codeword error or the total number of codeword errors. After all rows in all banks and in all bank groups in a DRAM chip (die) have ECS operations performed, the result of the ECS error counter 122 is loaded into a register 132.

The EpRC 124 counts the number of codewords errors on a given memory row, after more than one error on a given row is detected. The EpRC 124 is reset with each column address wrap. Each row's codeword error count is compared to the previous codeword error count by a comparator 142 to determine the row address with the highest error count within the DRAM die. After reading all codewords on a row, the number of errors counted is compared to the number of errors from the previous row. If the previous row error count is less than the present row error count, the present error count is saved to the Previous High Error Count register 136, its associated address is saved to the Previous High Error Count Row/Bank Address/Bank Group register 138, and the present row error counter is cleared. If the previous row error count is same as or greater than the present row error count, the previous row error count and register value remains unchanged, but the present row error counter is cleared. After all rows in all banks and in all bank groups in a DRAM chip (die) have executed ECS operations, the result of the counters 136 and 138 (i.e., the highest number of errors per row detected during the period and the corresponding memory address) are latched into a register 134 when the bank group counter wraps.

Basic input/output system (BIOS) will perform initialization for ECS during boot time including programing an ECS all bank refresh interval and enabling an ECS automatic mode, etc. In runtime, an SMI handler or a BIOS SMM handler will check that an SMI source is patrol completion in 24 hours and collect ECS data by an IMC patrol scrub complete SMI. BIOS collects each memory channel ECS error data each 24 hours by a patrol scrub complete SMI. These frequent SMIs can cause a significant interruption on customers usage. It can delay customer tasks for tens of milliseconds in each round of ECS data collection and impact user experience and system performance seriously. Table 1 shows an example for the average time for ECS data collection for each memory channel.

TABLE 1

| | DIMM population: | | | |
|---|---|---|---|---|
| Number | 16GB × 8 dimm (1) Socket0(HEX) | 16GB × 8 dimm (1) Socket1(HEX) | Sum(ns) | Sum(µs) |
| 1 | 29d4a | 2a44d | 344471 | 344.471 |
| 2 | 29eaa | 2a44e | 344824 | 344.824 |
| 3 | 29e8a | 2a4b0 | 344890 | 344.89 |
| 4 | 29edd | 2a427 | 344836 | 344.836 |
| 5 | 29ccd | 29ecd | 342938 | 342.938 |

TABLE 1-continued

| | DIMM population: | | | |
|---|---|---|---|---|
| Number | 16GB × 8 dimm (1) Socket0(HEX) | 16GB × 8 dimm (1) Socket1(HEX) | Sum(ns) | Sum(µs) |
| 6 | 29bed | 2a163 | 343376 | 343.376 |
| 7 | 2c135 | 27c48 | 343421 | 343.421 |
| 8 | 2c256 | 27b7b | 343505 | 343.505 |
| 9 | 2c22d | 27898 | 342725 | 342.725 |
| 10 | 2c403 | 2770e | 342801 | 342.801 |
| AVERAGE | | | 343778.7 | 343.7787 |

Currently, there is no error threshold mechanism implemented for ECS error reporting in current hardware (HW) solution and the HW solution cost is high. An integrated memory controller (IMC) triggers a patrol scrub complete SMI in each 24 hours periodically even though there is no ECS error. BIOS has to check which memory rank has an ECS error one by one in each 24 hours.

Figure 2:
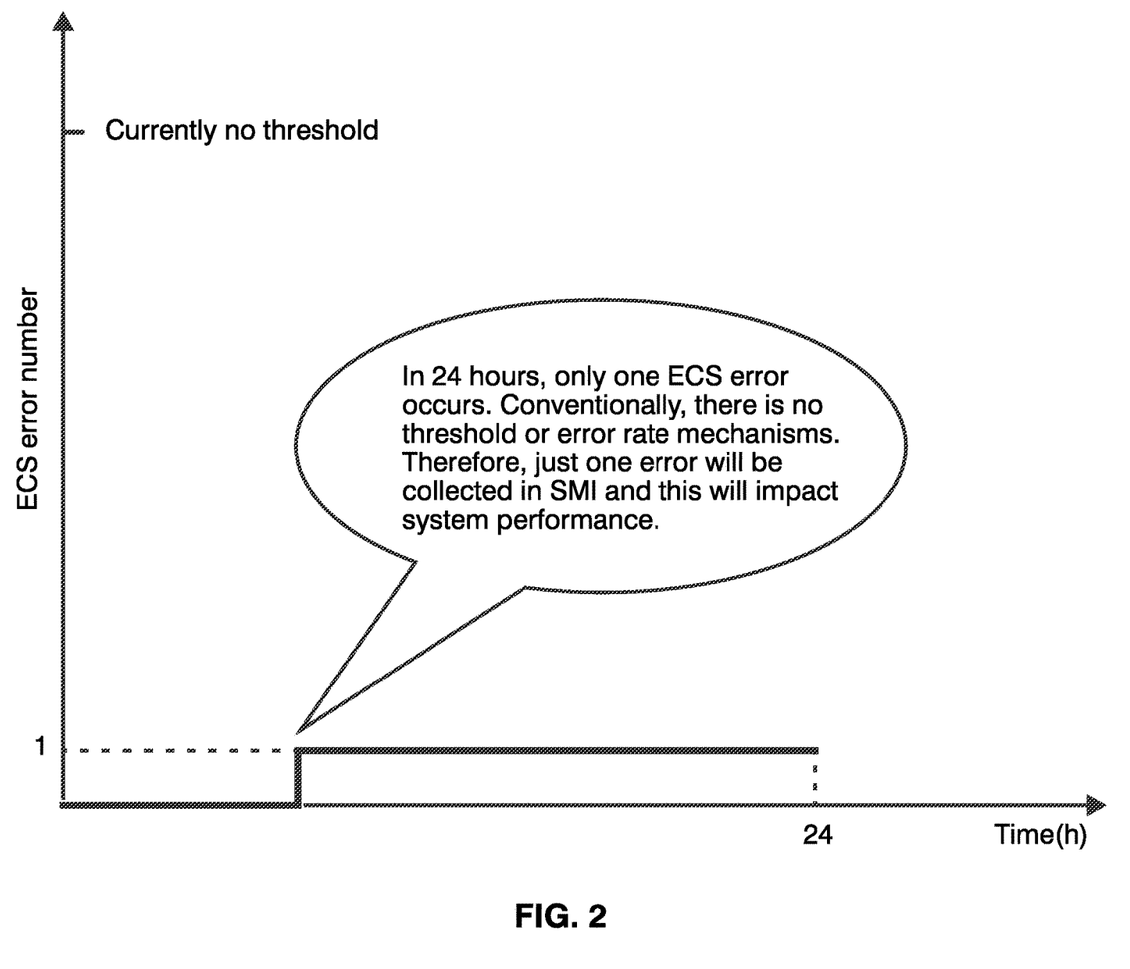
FIG. 2 illustrates a scenario for conventional patrol scrubbing.

In addition, there is no ECS error rate threshold mechanism. Even only one ECS correctable error happens in 24 hours, the IMC still triggers a patrol scrub complete SMI in each 24 hours to ask the BIOS to check and collect ECS error data. It impacts user experience and system performance seriously. FIG. 2 illustrates a scenario for a conventional patrol scrubbing. In FIG. 2, the conventional patrol scrubbing does not have a threshold and capability to calculate an error increase rate. In the example shown in FIG. 2, only one ECS error occurs in 24 hours and just one error will be collected in SMI. This can impact the system performance.

Moreover, the SMI entry/exit and long SMI latency of ECS error data collection can block a CPU from entering a power saving state/mode (CPU C state and package C state), and the CPU will be brought out of C state when SMI occurs. It also impacts system power management.

Conventionally, the ECS error data is collected via a patrol scrub complete SMI. Using BIOS to collect ECS error data every 24-hour periods by a patrol scrub complete SMI will impact user experience and system performance seriously.

Examples are disclosed for schemes for ECS error data collection and reporting for a memory device. Hereafter, the examples will be explained with reference to Joint Electronic Device Engineering Council (JEDEC) Double Data Rate 5 (DDR5) memory devices. However, it should be noted that the examples disclosed herein are applicable to memory devices supporting different generations of the DDR standards or any memory standards.

Figure 3:
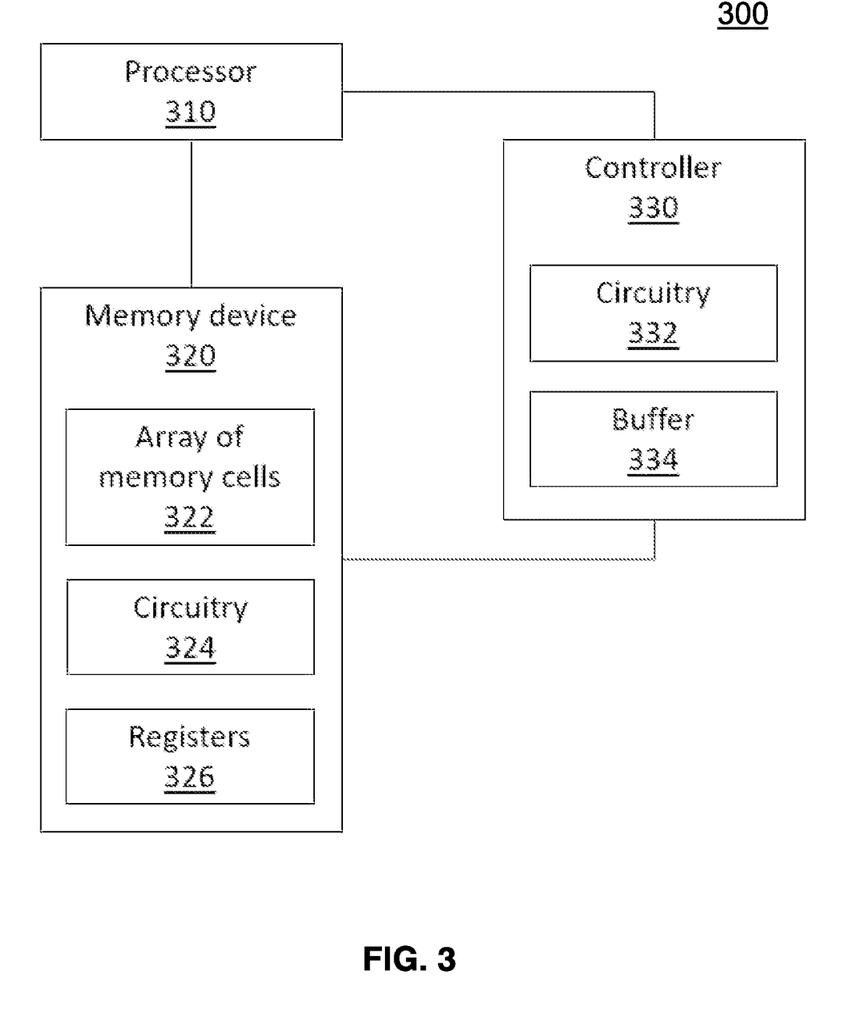
FIG. 3 shows a block diagram of a system in accordance with one example.

FIG. 3 shows a block diagram of a system 300 in accordance with one example. The system 300 includes a processor 310, a memory device 320, and a controller 330. The memory device 320 includes an array of memory cells 322 for storing data. For example, the memory device 320 may be a DRAM device (chip/die) including an array of DRAM memory cells. The memory device 320 may be included in a memory module such as a dual in-line memory module (DIMM). The memory device 320 may include circuitry 324 configured to perform ECC and ECS operations on the array of memory cells 322 and registers 326 for storing ECS error data. For example, the memory device 320 may include the system 100 shown in FIG. 1.

The JEDEC DDR standards specify the ECS function by using in-DRAM error correction codes (IECC) because the reliability of a DRAM cell has gradually deteriorated as the cell capacity scales down. The memory device 320 is equipped with on-die ECC to correct at least a single-bit error for each codeword. The ECS operation periodically reads data in the memory device 320 and corrects an error if it occurs. The ECS operation internally checks the occurrence of a single-bit error with the IECC module after reading a memory array and writes back the corrected data if an error occurs. The ECS operation is periodically conducted with a certain interval to scrub the whole memory chip every predetermined period (e.g., 24 hours). During the ECS mode, the information such as the total error count, and the error count per row and the corresponding address are updated in real-time.

The processor 310 (i.e., BIOS) may be configured to obtain the ECS error data in response to an interrupt by the controller 330 and perform memory reliability, availability, and serviceability (RAS) actions to recover failed memory in the array of memory cells of the memory device 320. As will be explained below, the controller 330 reads the ECS error data (e.g., the total error count) from the memory device 320 and may send an interrupt to the processor 310 based on the ECS error data. Upon reception of the interrupt, the processor 310 (i.e., BIOS) may be configured to read the ECS error data directly from the controller 330 (from the buffer 334). In some examples, the processor 310 (i.e., BIOS) may be configured to perform an RAS action, such as post-package repair (PPR) or adaptive double DRAM device correction (ADDDC), after obtaining the ECS error data.

A memory device may have faulty rows, columns, chips, or banks. Some of the faults may be transient (temporary) while other faults may be permanent. To address transient and non-transient memory failures, a memory device may be provided with a PPR capability. Based on the ECC error data within a codeword, a memory controller may detect permanent or transient errors. PPR allows a memory controller to remap the faulty row to a spare row. The DDR standards define two types of PPR remapping capabilities: hard-PRR and soft-PRR. Hard-PPR permanently remaps accesses from a faulty row to a designated spare row, while soft-PPR temporarily remaps accesses from a faulty row to a designated spare row.

ADDDC is deployed at runtime to dynamically map out the failing DRAM device and continue to provide Single Device Data Correction (SDDC) ECC coverage on the DIMM. The ADDDC operation may occur at the granularity of DRAM bank or rank. When the number of corrections on a DRAM device reaches the targeted threshold value, the identified failing DRAM region is adaptively placed in a lockstep mode where the identified failing region of the DRAM device is mapped out of ECC. The BIOS may read the ECS error data directly from the controller 330 and perform PPR or ADDDC to recover the failing memory region in the memory device 320.

The controller 330 includes circuitry 332. The circuitry 332 may be configured to read ECS error data from the register 326 of the memory device 320 and may calculate an ECS error increase rate based on the ECS error data. The circuitry 332 may read the ECS error data from the register 326 of the memory device 320 periodically in each predetermined period and calculate the ECS error increase rate periodically. The ECS error data that the controller 330 retrieves from the memory device 320 may be the total number of ECS errors on the memory device 320 detected during each predetermined period (e.g., the count value latched to the register 132 in FIG. 1). The ECS error data that the controller 330 retrieves from the memory device 320 may also include the highest number of errors per row detected during each predetermined period and the corresponding memory address (e.g., the values latched to the register 134 in FIG. 1).

The circuitry 332 may be configured to inform the BIOS running on the processor 310 by interrupt if the total number of ECS errors reaches or exceeds an ECS error number threshold, or the ECS error increase rate reaches or exceeds an ECS error rate threshold. The controller 330 may include a buffer 334 to save the ECS error data, i.e., the total number of ECS errors on the memory device 320 detected during each predetermined period (e.g., the count value latched to the register 132 in FIG. 1) and the highest number of errors per row detected during each predetermined period and the corresponding memory address (e.g., the values latched to the register 134 in FIG. 1). The circuitry 332 may save the ECS error data in the buffer 334 if the circuitry sends an interrupt to the BIOS as the total number of ECS errors reaches or exceeds the ECS error number threshold, or the ECS error increase rate reaches or exceeds the ECS error rate threshold. The processor 310 (i.e., BIOS) may read the ECS error data from the buffer 334 of controller 330 instead of from the memory device 320.

In some examples, the controller 330 may be an out-of-band (OOB) device/agent (a separate device from the processor 310 having a separate way to access the memory device 320). For example, the controller 330 may be a baseboard management controller (BMC) or a memory micro-controller (MMC), etc. A BMC and an MMC can access IMC registers and/or the mode registers (MRs) (132, 134 in FIG. 1) in the memory device. In some examples, a BMC or an MMC may be used to collect ECS error data to monitor memory error by reading the registers in the memory device 320.

A BMC is a specialized processor used for remote monitoring and management of a host system. A BMC may be located on the main motherboard of the system. The BMC may be used to monitor the hardware (such as central processing unit (CPU), memory, hard drive, etc.) on the motherboard and collect the device information of the board. The BMC may be accessed remotely either via a dedicated or shared network connection and have connections to the host system. A BMC allows a system administrator to perform many different monitoring and management tasks remotely. An MMC is a controller that can be used to do DDR training. The MMC-based memory RAS offload can minimize runtime SMIs for CE handling while providing significantly greater error visibility for improved RAS actions. BIOS will configure the MMC during system boot time and the MMC can also be used in memory error runtime handling.

In some examples disclosed herein, a controller 330 (e.g., an OOB device such as a BMC or an MMC) may be utilized to monitor, and report, the status of the DDR ECS error of the memory device 320. In examples, monitoring the status of the DDR ECS error of the memory device 320 may be performed by tracking the ECS error number and/or calculating an ECS error increase rate. If the number of ECS errors or the ECS error increase rate reaches or exceeds a respective predetermined threshold, the controller 330 may report it to the BIOS by interrupt. In some examples, the BIOS may then obtain the ECS error data directly from the controller 330 (e.g., from the BMC using memory mapped BMC interface or from the MMC using a mailbox command). The BIOS may obtain the ECS error data from the buffer 334 of the controller 330 and then recover the failed memory by an RAS action. For example, the BIOS may implement PPR, ADDDC, or the like to recover the failed memory.

The BIOS may report an error log to the operating system (OS) to inform the user. Alternatively, system administrators may obtain the ECS error data directly from the controller 330 (e.g., a BMC or an MMC) if they do not want to rely on BIOS recovery action and OS error log.

By implementing the schemes according to the disclosed examples, the ECS data collection SMI latency can be improved significantly. The DDR5 ECS error report mechanism can be improved by using a software error threshold and an error rate mechanism.

In examples, an OOB device such as a BMC or an MMC is utilized to monitor the status of an DDR ECS error. Monitoring is done by tracking the ECS error number and calculating an ECS error increase rate. If the ECS error number or the ECS error increase rate reaches or exceeds a respective pre-defined threshold, the BMC or MMC informs the BIOS by interrupt. The BIOS then fetches the ECS error data, for example from the BMC or the MMC. One of the advantages of the examples disclosed herein is that all the monitoring, status recording and error rate calculation of the ECS error can be performed by the OOB device (e.g., a BMC or an MMC), which means that there is no performance impact on a system (e.g., a server/cloud system).

Figure 4:
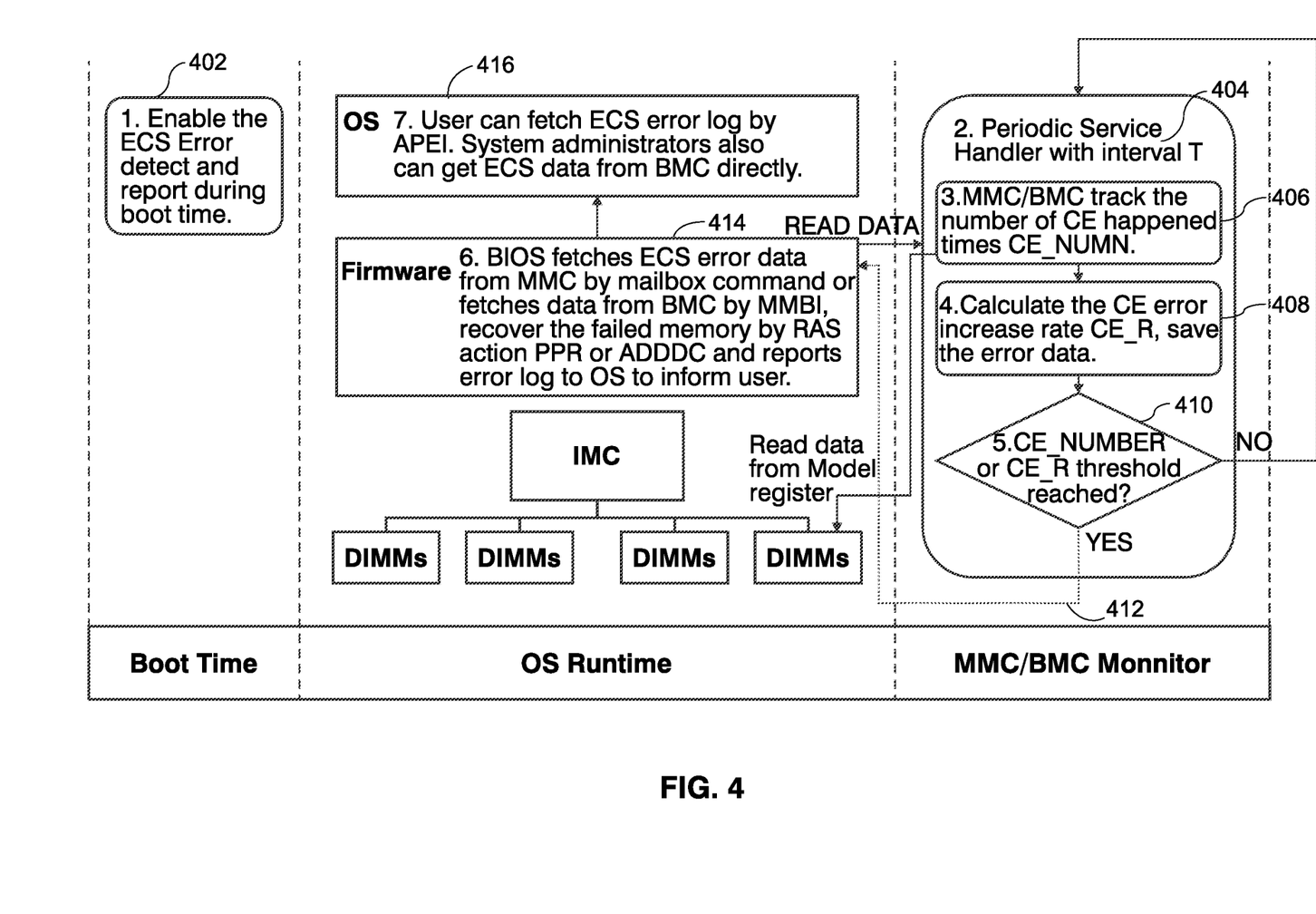
FIG. 4 shows an example flow for collecting ECS error data using a baseboard management controller (BMC) or a memory microcontroller (MMC) in accordance with one example.

FIG. 4 shows an example flow for collecting ECS error data using a BMC or an MMC (as an example of an OOB controller) in accordance with one example. During boot time, the BIOS enables ECS error detect and report by a BMC or MMC (402). The BMC or MMC then starts a periodic service handler with a time interval, $T_{interval}$ (404). During each time interval $T_{interval}$, the BMC or MMC tracks an ECS error number ($CE\_NUM_N$) of a memory device, for example by reading a DIMM mode register (e.g., the registers 132, 134) and record the time stamp in each time interval (406). The subscript N is an index for the time interval.

The BMC or MMC calculates an ECS error increase rate based on the retrieved ECS error number (408). For example, the BMC or MMC may calculate the ECS error increase rate for the time interval N by $(CE\_NUM_N - CE\_NUM_{N-1})/T_{interval}$.

The BMC or MMC determines whether the number of ECS errors reaches or exceeds the error number threshold, and/or the ECS error increase rate reaches or exceeds the error rate threshold (410). If it is determined that the number of ECS errors does not reach or exceed the error number threshold and/or the ECS error increase rate does not reach or exceed the error rate threshold, the BMC or MMC keeps monitoring. If it is determined that the number of ECS errors reaches or exceeds the error number threshold and/or the ECS error increase rate reaches or exceeds the error rate threshold, the BMC or MMC may inform the BIOS by interrupt (412).

The BIOS may then fetch the ECS error data from the BMC using memory mapped BMC interface (MMBI), or from the MMC using a mailbox command, and then recover the failed memory by an RAS action (414). For example, the BIOS may recover the failed memory by implementing PPR or ADDDC. The BIOS may also report an error log to the OS to inform the user (414).

The user can get the error log by advanced platform error interface (APEI) or read the ECS data from the BMC (416). APEI allows to report errors (e.g., from a chipset) to the operating system. APEI extends existing hardware error reporting mechanisms and brings them together as components of a coherent hardware error infrastructure. System administrators can also get the ECS data from the BMC directly if they do not want to rely on BIOS recovery action and OS error log.

Figure 5:
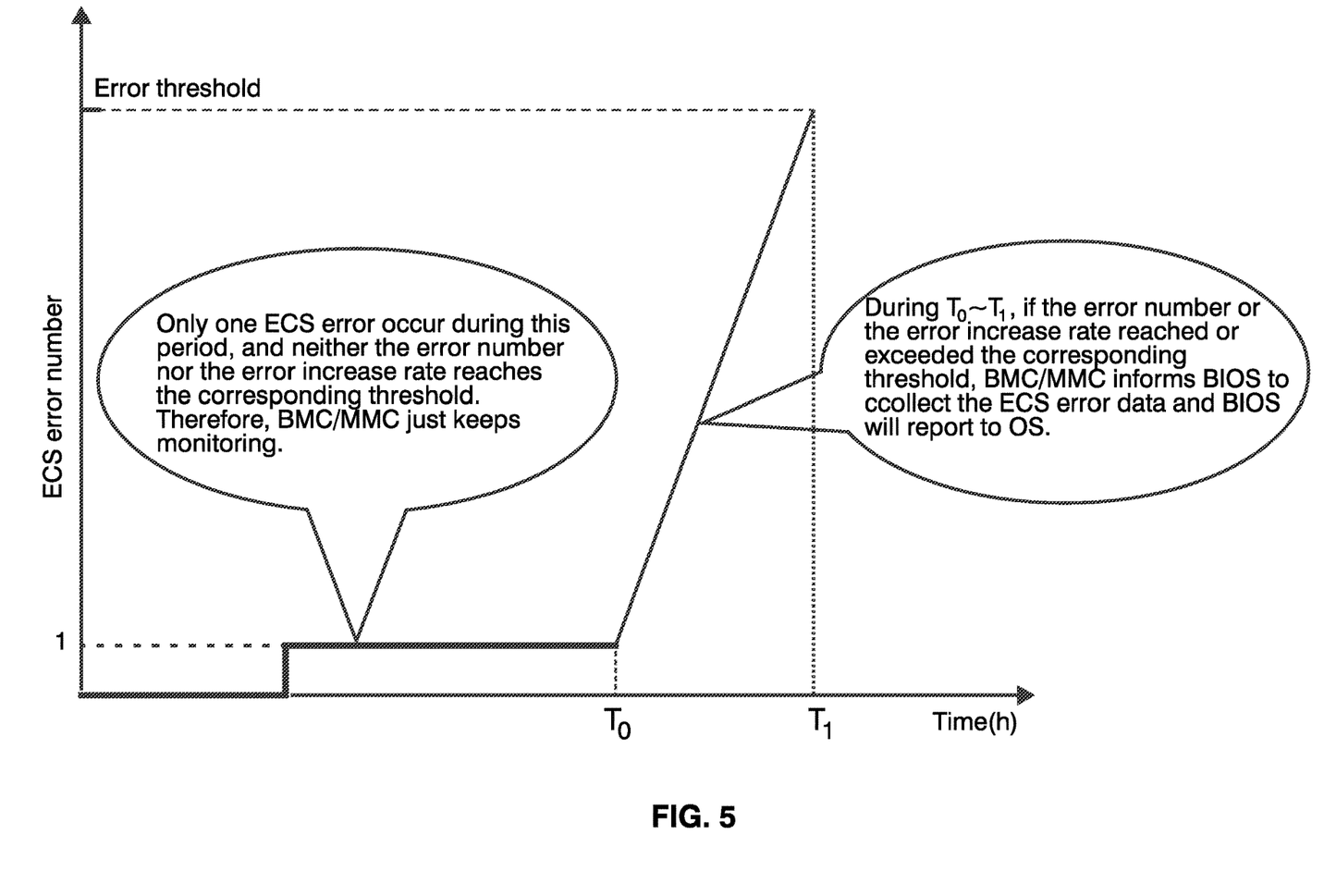
FIG. 5 illustrates an example case that a controller monitors the ECS error number and calculates an ECS error increase rate and reports the ECS error status based on the ECS error number or the ECS error increase rate.

FIG. 5 illustrates an example case that a controller (e.g., a BMC or MMC) monitors the ECS error number and calculate the ECS error increase rate and reports the ECS error status based on the ECS error number or the ECS error increase rate. During the period until $T_0$, only one ECS error occurs. The BMC or MMC periodically retrieves the ECS error number from the memory device (e.g., the DIMM mode register) as disclosed above and calculates an ECS error increase rate based on the obtained ECS error numbers. During this period, neither the ECS error number nor the ECS error increase rate reaches or exceeds a respective predetermined threshold. Therefore, the BMC or the MMC just keeps monitoring the ECS error number.

During the period from $T_0$ to $T_1$, the ECS error number increases and the error number threshold is reached, or the ECS error increase rate reaches or exceeds a predetermined error rate threshold. The BMC or the MMC saves the error data in an error buffer and informs the BIOS by an interrupt. The BIOS can fetch the error data from the BMC or the MMC (i.e., from the error buffer) directly instead of reading the mode registers in the memory device and initiates a recovery process and reports to the OS.

Figure 6:
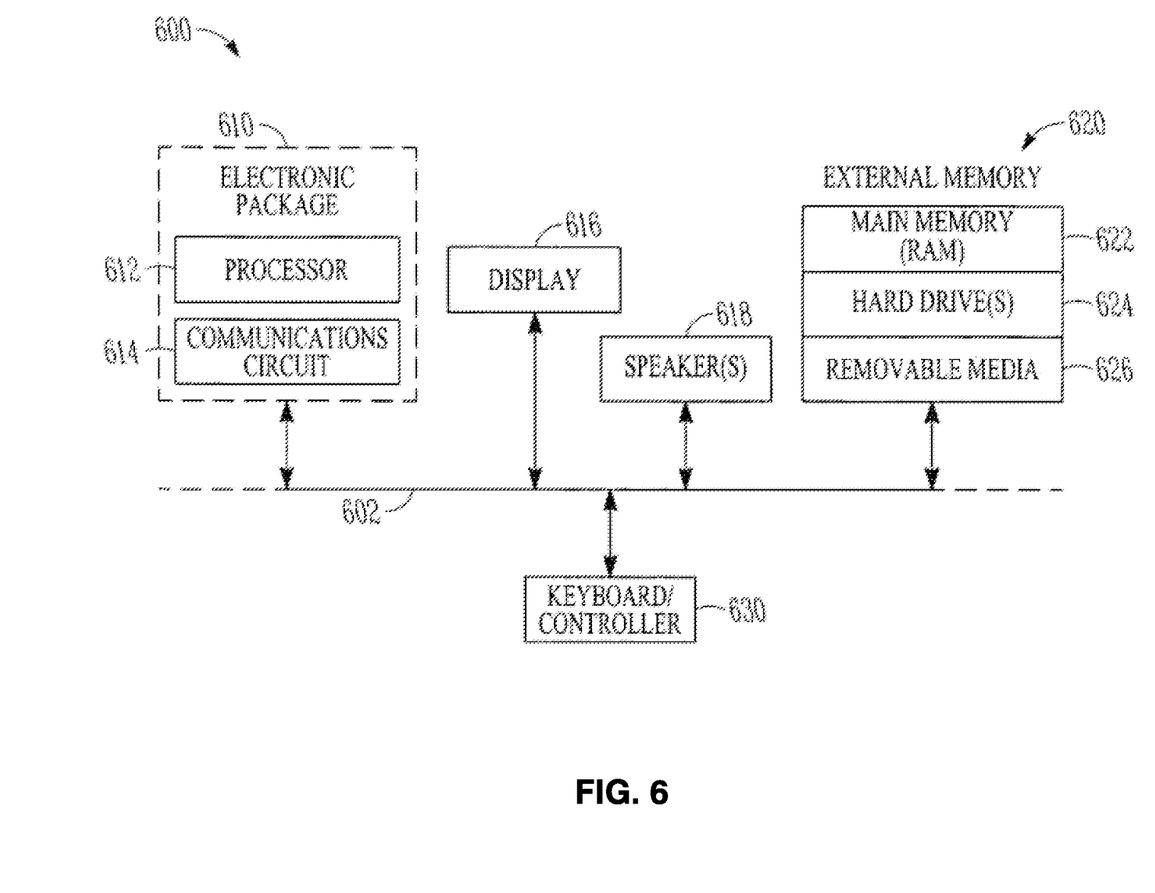
FIG. 6 is a block diagram of an electronic apparatus incorporating at least one electronic assembly and/or method described herein.

FIG. 6 is a block diagram of an electronic apparatus 600 incorporating at least one electronic assembly and/or method described herein. Electronic apparatus 600 is merely one example of an electronic apparatus in which forms of the electronic assemblies and/or methods described herein may be used. Examples of an electronic apparatus 600 include, but are not limited to, personal computers, tablet computers, mobile telephones, game devices, MP3 or other digital music players, etc. In this example, electronic apparatus 600 comprises a data processing system that includes a system bus 602 to couple the various components of the electronic apparatus 600. System bus 602 provides communications links among the various components of the electronic apparatus 600 and may be implemented as a single bus, as a combination of busses, or in any other suitable manner.

An electronic assembly 610 as describe herein may be coupled to system bus 602. The electronic assembly 610 may include any circuit or combination of circuits. In one embodiment, the electronic assembly 610 includes a processor 612 which can be of any type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that may be included in electronic assembly 610 are a custom circuit, an application-specific integrated circuit (ASIC), or the like, such as, for example, one or more circuits (such as a communications circuit 614) for use in wireless devices like mobile telephones, tablet computers, laptop computers, two-way radios, and similar electronic systems. The IC can perform any other type of function.

The electronic apparatus 600 may also include an external memory 620, which in turn may include one or more memory elements suitable to the particular application, such as a main memory 622 in the form of random access memory (RAM), one or more hard drives 624, and/or one or more drives that handle removable media 626 such as compact disks (CD), flash memory cards, digital video disk (DVD), and the like.

The electronic apparatus 600 may also include a display device 616, one or more speakers 618, and a keyboard and/or controller 630, which can include a mouse, trackball, touch screen, voice-recognition device, or any other device that permits a system user to input information into and receive information from the electronic apparatus 600.

Figure 7:
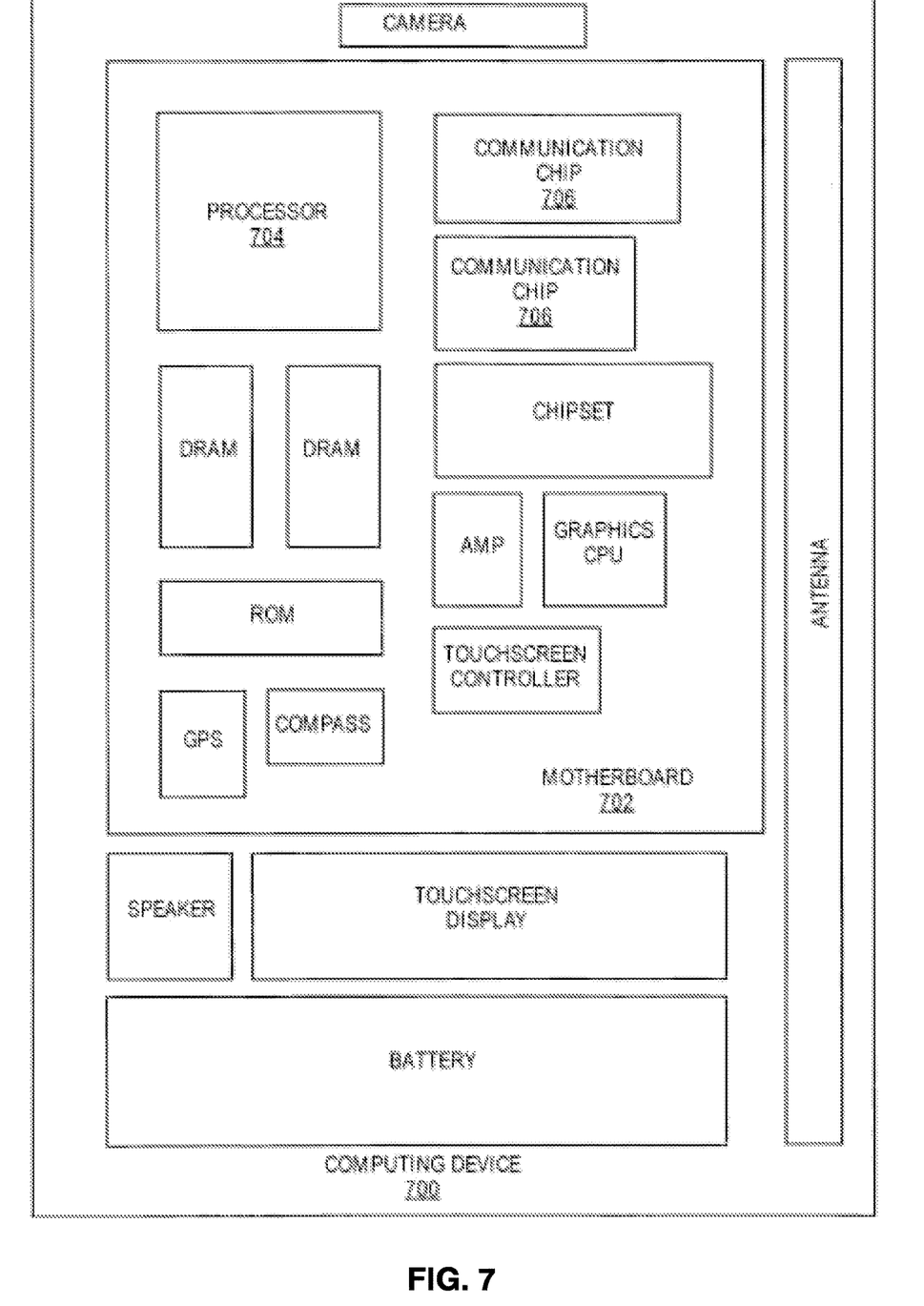
FIG. 7 illustrates a computing device in accordance with one implementation of the invention.

FIG. 7 illustrates a computing device 700 in accordance with one implementation of the invention. The computing device 700 houses a board 702. The board 702 may include a number of components, including but not limited to a processor 704 and at least one communication chip 706. The processor 704 is physically and electrically coupled to the board 702. In some implementations the at least one communication chip 706 is also physically and electrically coupled to the board 702. In further implementations, the communication chip 706 is part of the processor 704. Depending on its applications, computing device 700 may include other components that may or may not be physically and electrically coupled to the board 702. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth). The communication chip 706 enables wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others. The processor 704 of the computing device 700 includes an integrated circuit die packaged within the processor 704. In some implementations of the invention, the integrated circuit die of the processor includes one or more devices that are assembled in an ePLB or eWLB based POP package that that includes a mold layer directly contacting a substrate, in accordance with implementations of the invention. The term "processor" may refer to any device or portion of a device that processes electronic data from registers and/or memory to transform that electronic data into other electronic data that may be stored in registers and/or memory. The communication chip 706 also includes an integrated circuit die packaged within the communication chip 706. In accordance with another implementation of the invention, the integrated circuit die of the communication chip includes one or more devices that are assembled in an ePLB or eWLB based POP package that that includes a mold layer directly contacting a substrate, in accordance with implementations of the invention.

Figure 8:
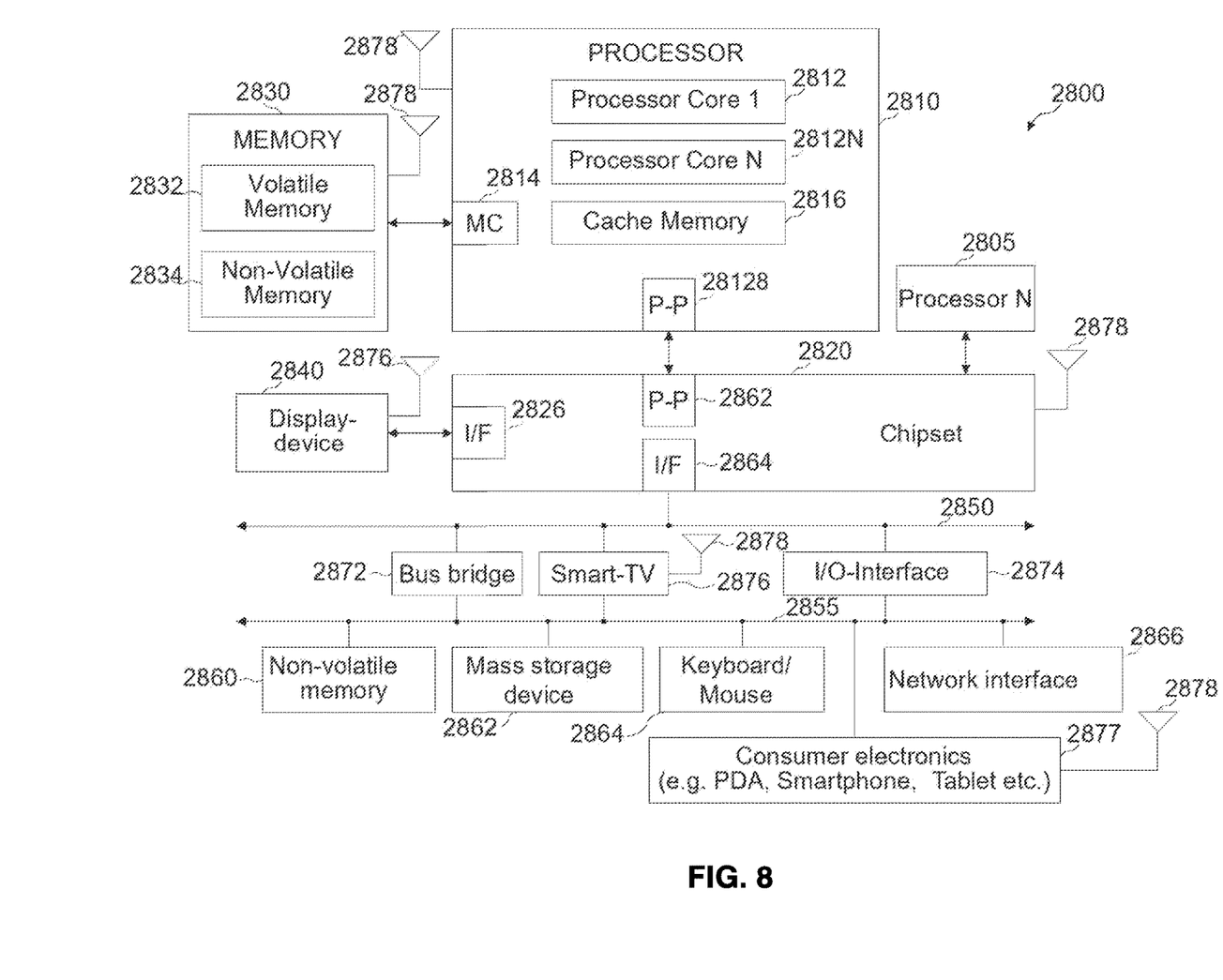
FIG. 8 shows an example of a higher-level device application for the disclosed embodiments.

FIG. 8 is included to show an example of a higher-level device application for the disclosed embodiments. The MAA cantilevered heat pipe apparatus embodiments may be found in several parts of a computing system. In an embodiment, the MAA cantilevered heat pipe is part of a communications apparatus such as is affixed to a cellular communications tower. The MAA cantilevered heat pipe may also be referred to as an MAA apparatus. In an embodiment, a computing system 2800 includes, but is not limited to, a desktop computer. In an embodiment, a system 2800 includes, but is not limited to a laptop computer. In an embodiment, a system 2800 includes, but is not limited to a netbook. In an embodiment, a system 2800 includes, but is not limited to a tablet. In an embodiment, a system 2800 includes, but is not limited to a notebook computer. In an embodiment, a system 2800 includes, but is not limited to a personal digital assistant (PDA). In an embodiment, a system 2800 includes, but is not limited to a server. In an embodiment, a system 2800 includes, but is not limited to a workstation. In an embodiment, a system 2800 includes, but is not limited to a cellular telephone. In an embodiment, a system 2800 includes, but is not limited to a mobile computing device. In an embodiment, a system 2800 includes, but is not limited to a smart phone. In an embodiment, a system 2800 includes, but is not limited to an internet appliance. Other types of computing devices may be configured with the microelectronic device that includes MAA apparatus embodiments.

In an embodiment, the processor 2810 has one or more processing cores 2812 and 2812N, where 2812N represents the Nth processor core inside processor 2810 where N is a positive integer. In an embodiment, the electronic device system 2800 using a MAA apparatus embodiment that includes multiple processors including 2810 and 2805, where the processor 2805 has logic similar or identical to the logic of the processor 2810. In an embodiment, the processing core 2812 includes, but is not limited to, pre-fetch logic to fetch instructions, decode logic to decode the instructions, execution logic to execute instructions and the like. In an embodiment, the processor 2810 has a cache memory 2816 to cache at least one of instructions and data for the MAA apparatus in the system 2800. The cache memory 2816 may be organized into a hierarchal structure including one or more levels of cache memory.

In an embodiment, the processor 2810 includes a memory controller 2814, which is operable to perform functions that enable the processor 2810 to access and communicate with memory 2830 that includes at least one of a volatile memory 2832 and a non-volatile memory 2834. In an embodiment, the processor 2810 is coupled with memory 2830 and chipset 2820. The processor 2810 may also be coupled to a wireless antenna 2878 to communicate with any device configured to at least one of transmit and receive wireless signals. In an embodiment, the wireless antenna interface 2878 operates in accordance with, but is not limited to, the IEEE 802.11 standard and its related family, Home Plug AV (HPAV), Ultra Wide Band (UWB), Bluetooth, WiMax, or any form of wireless communication protocol.

In an embodiment, the volatile memory 2832 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2834 includes, but is not limited to, flash memory, phase change memory (PCM), read-only memory (ROM), electrically erasable programmable read-only memory (EEPROM), or any other type of non-volatile memory device.

The memory 2830 stores information and instructions to be executed by the processor 2810. In an embodiment, the memory 2830 may also store temporary variables or other intermediate information while the processor 2810 is executing instructions. In the illustrated embodiment, the chipset 2820 connects with processor 2810 via Point-to-Point (PtP or P-P) interfaces 2817 and 2822. Either of these PtP embodiments may be achieved using a MAA apparatus embodiment as set forth in this disclosure. The chipset 2820 enables the processor 2810 to connect to other elements in the MAA apparatus embodiments in a system 2800. In an embodiment, interfaces 2817 and 2822 operate in accordance with a PtP communication protocol such as the Intel® QuickPath Interconnect (QPI) or the like. In other embodiments, a different interconnect may be used.

In an embodiment, the chipset 2820 is operable to communicate with the processor 2810, 2805N, the display device 2840, and other devices 2872, 2876, 2874, 2860, 2862, 2864, 2866, 2877, etc. The chipset 2820 may also be coupled to a wireless antenna 2878 to communicate with any device configured to at least do one of transmit and receive wireless signals.

The chipset 2820 connects to the display device 2840 via the interface 2826. The display 2840 may be, for example, a liquid crystal display (LCD), a plasma display, cathode ray tube (CRT) display, or any other form of visual display device. In and embodiment, the processor 2810 and the chipset 2820 are merged into a MAA apparatus in a system. Additionally, the chipset 2820 connects to one or more buses 2850 and 2855 that interconnect various elements 2874, 2860, 2862, 2864, and 2866. Buses 2850 and 2855 may be interconnected together via a bus bridge 2872 such as at least one MAA apparatus embodiment. In an embodiment, the chipset 2820 couples with a non-volatile memory 2860, a mass storage device(s) 2862, a keyboard/mouse 2864, and a network interface 2866 by way of at least one of the interface 2824 and 2874, the smart TV 2876, and the consumer electronics 2877, etc.

In an embodiment, the mass storage device 2862 includes, but is not limited to, a solid state drive, a hard disk drive, a universal serial bus flash memory drive, or any other form of computer data storage medium. In one embodiment, the network interface 2866 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 8 are depicted as separate blocks within the MAA apparatus embodiment in a computing system 2800, the functions performed by some of these blocks may be integrated within a single semiconductor circuit or may be implemented using two or more separate integrated circuits. For example, although cache memory 2816 is depicted as a separate block within processor 2810, cache memory 2816 (or selected aspects of 2816) can be incorporated into the processor core 2812.

Where useful, the computing system 2800 may have a broadcasting structure interface such as for affixing the MAA apparatus to a cellular tower.

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The examples as described herein may be summarized as follows:

An example (e.g., example 1) relates to a controller for ECS error data collection and reporting for a memory device. The controller may include circuitry configured to read ECS error data from a register of a memory device and calculate an ECS error increase rate based on the ECS error data, and a buffer configured to store the ECS error data. The circuitry is further configured to inform BIOS by interrupt if a total number of ECS errors reaches or exceeds an ECS error number threshold or if the ECS error increase rate reaches or exceeds an ECS error rate threshold.

Another example, (e.g., example 2) relates to a previously described example (e.g., example 1), wherein the circuitry is configured to read the ECS error data from the memory device periodically.

Another example, (e.g., example 3) relates to a previously described example (e.g., any one of examples 1-2), wherein the ECS error data includes the total number of ECS errors on the memory device during a predetermined period for ECS operation.

Another example, (e.g., example 4) relates to a previously described example (e.g., any one of examples 2-3), wherein the ECS error data includes a highest number of ECS errors per memory row and a corresponding memory address during a predetermined period for ECS operation.

Another example, (e.g., example 5) relates to a previously described example (e.g., any one of examples 1-4), wherein the controller is a baseboard management controller.

Another example, (e.g., example 6) relates to a previously described example (e.g., any one of examples 1-4), wherein the controller is a memory micro controller.

Another example, (e.g., example 7) relates to a previously described example (e.g., any one of examples 1-6), wherein the memory device is a Double Data Rate (DDR) 5 memory device.

Another example, (e.g., example 8) relates to a system. The system may include a memory device including an array of memory cells, circuitry configured to perform ECS on the array of memory cells, and registers for storing ECS error data, the controller as in any one of examples 1-7, and a processor configured to obtain the ECS error data and perform an action to recover a failed memory in the array of memory cells in response to an interrupt by the controller.

Another example, (e.g., example 9) relates to a previously described example (e.g., example 8), wherein the processor is configured to read the ECS error data from the controller upon reception of the interrupt.

Another example, (e.g., example 10) relates to a previously described example (e.g., any one of examples 8-9), wherein the processor is configured to perform PPR or ADDDC after obtaining the ECS error data to recover a failed memory.

Another example, (e.g., example 11) relates to a previously described example (e.g., any one of examples 8-10), wherein the controller is a BMC or an MMC.

Another example, (e.g., example 12) relates to a previously described example (e.g., any one of examples 8-11), wherein the processor is configured to report an error log to an operating system.

Another example, (e.g., example 13) relates to a method for ECS error data collection and reporting for a memory device. The method may include reading ECS error data from a register of a memory device, calculating an ECS error increase rate based on the ECS error data, and informing BIOS if an ECS error number reaches or exceeds an ECS error number threshold or if the ECS error increase rate reaches or exceeds an ECS error rate threshold.

Another example, (e.g., example 14) relates to a previously described example (e.g., example 13), further comprising saving the ECS error data in a buffer.

Another example, (e.g., example 15) relates to a previously described example (e.g., any one of examples 13-14), wherein the ECS error data is read from the memory device periodically.

Another example, (e.g., example 16) relates to a previously described example (e.g., any one of examples 13-15), wherein the ECS error data includes a total number of ECS errors on the memory device during a predetermined period for ECS operation.

Another example, (e.g., example 17) relates to a previously described example (e.g., any one of examples 13-16), wherein the ECS error data includes a highest number of ECS errors per memory row and a corresponding memory address during a predetermined period for ECS operation.

Another example, (e.g., example 18) relates to a previously described example (e.g., any one of examples 13-17), wherein the method is implemented by a baseboard management controller or a memory micro controller.

Another example, (e.g., example 19) relates to a previously described example (e.g., any one of examples 13-18), wherein the memory device is a DDR5 memory device.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile memory) optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion) thereof may be performed by hardware components comprising non-programmable circuitry. In some examples, any of the methods herein can be performed by a combination of non-programmable hardware components and one or more processing units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

As used in this application and the claims, a list of items joined by the term "and/or" can mean any combination of the listed items. For example, the phrase "A, B and/or C" can mean A; B; C; A and B; A and C; B and C; or A, B and C. As used in this application and the claims, a list of items joined by the term "at least one of" can mean any combination of the listed terms. For example, the phrase "at least one of A, B or C" can mean A; B; C; A and B; A and C; B and C; or A, B, and C. Moreover, as used in this application and the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses, and systems are not to be construed as limiting in any way. Instead, the present disclosure is directed toward all novel and nonobvious features and aspects of the various disclosed examples, alone and in various combinations and subcombinations with one another. The disclosed methods, apparatuses, and systems are not limited to any specific aspect or feature or combination thereof, nor do the disclosed examples require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

What is claimed is:

1. A controller for error check and scrub (ECS) error data collection and reporting for a memory device, comprising:
   circuitry configured to read ECS error data from a register of a memory device and calculate an ECS error increase rate based on the ECS error data, wherein the circuitry is further configured to inform basic input output system (BIOS) by interrupt if a total number of ECS errors reaches or exceeds an ECS error number threshold or if the ECS error increase rate reaches or exceeds an ECS error rate threshold; and
   a buffer configured to store the ECS error data,
   wherein the controller is a device separate from a processor configured to run the BIOS.

2. The controller of claim 1, wherein the circuitry is configured to read the ECS error data from the memory device periodically.

3. The controller of claim 2, wherein the ECS error data includes the total number of ECS errors on the memory device during a predetermined period for ECS operation.

4. The controller of claim 2, wherein the ECS error data includes a highest number of ECS errors per memory row and a corresponding memory address during a predetermined period for ECS operation.

5. The controller of claim 1, wherein the controller is a baseboard management controller.

6. The controller of claim 1, wherein the controller is a memory micro controller.

7. The controller of claim 1, wherein the memory device is a Double Data Rate (DDR) 5 memory device.

8. A system, comprising:
   a memory device including an array of memory cells, circuitry configured to perform error check and scrub (ECS) on the array of memory cells, and registers for storing ECS error data;
   the controller of claim 1; and
   a processor configured to obtain the ECS error data and perform an action to recover a failed memory in the array of memory cells in response to an interrupt by the controller.

9. The system of claim 8, wherein the processor is configured to read the ECS error data from the controller upon reception of the interrupt.

10. The system of claim 8, wherein the processor is configured to perform post-package repair (PPR) or adaptive double DRAM device correction (ADDDC) after obtaining the ECS error data to recover a failed memory.

11. The system of claim 8, wherein the controller is a baseboard management controller (BMC) or a memory micro-controller (MMC).

12. The system of claim 8, wherein the processor is configured to report an error log to an operating system.

13. A method for error check and scrub (ECS) error data collection and reporting for a memory device, comprising:
   reading, by a controller, ECS error data from a register of a memory device;
   calculating, by the controller, an ECS error increase rate based on the ECS error data; and
   informing, by the controller, basic input/output system (BIOS) if an ECS error number reaches or exceeds an ECS error number threshold or if the ECS error increase rate reaches or exceeds an ECS error rate threshold, wherein the controller is a device separate from a processor configured to run the BIOS.

14. The method of claim 13, further comprising saving the ECS error data in a buffer.

15. The method of claim 13, wherein the ECS error data is read from the memory device periodically.

16. The method of claim 13, wherein the ECS error data includes a total number of ECS errors on the memory device during a predetermined period for ECS operation.

17. The method of claim 13, wherein the ECS error data includes a highest number of ECS errors per memory row and a corresponding memory address during a predetermined period for ECS operation.

18. The method of claim 13, wherein the method is implemented by a baseboard management controller or a memory micro controller.

19. The method of claim 13, wherein the memory device is a Double Data Rate (DDR) 5 memory device.

* * * * *